F. B. TICE.
GATE.
APPLICATION FILED SEPT. 17, 1908.
939,568.
Patented Nov. 9, 1909.
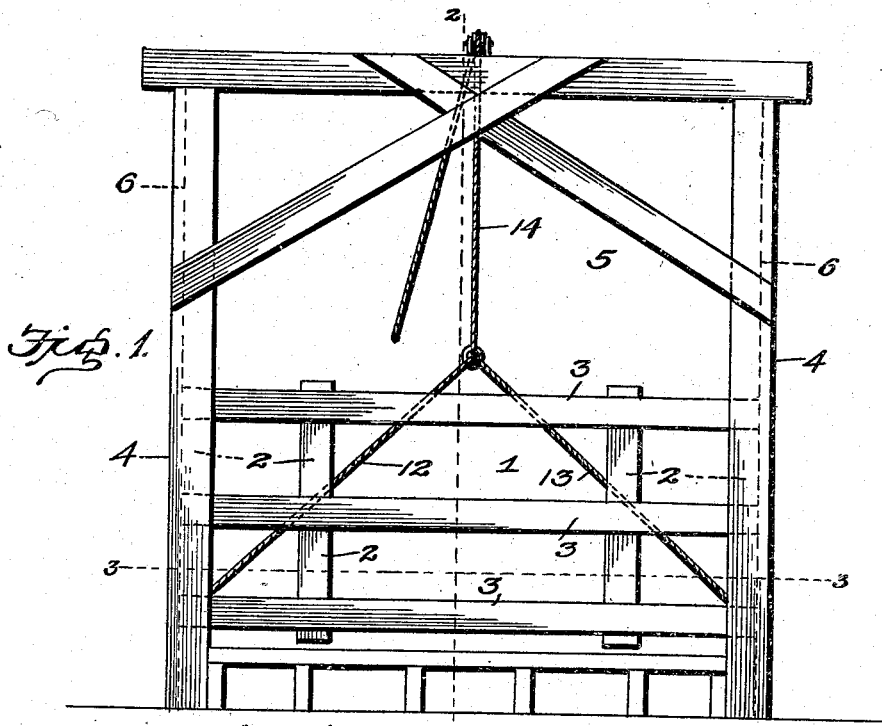
Fig. 1.
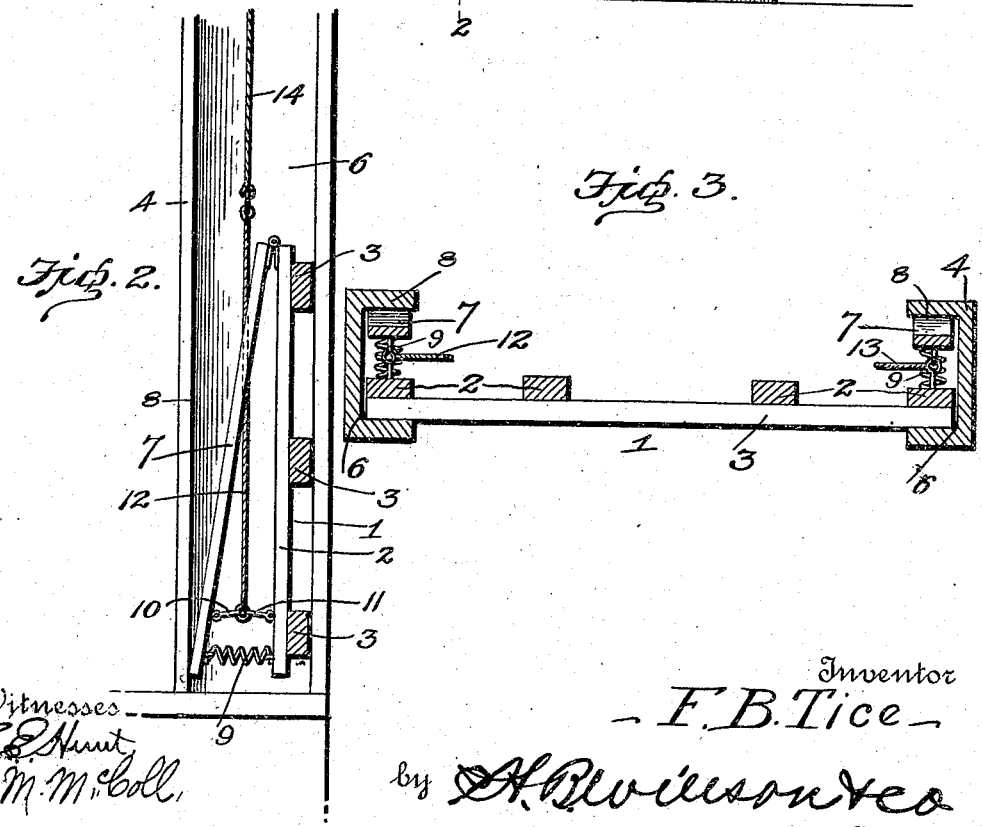
Fig. 2.
Fig. 3.
Witnesses
C. E. Hunt
S. M. McColl
Inventor
F. B. Tice
by H. B. Willson & Co.
Attorneys

UNITED STATES PATENT OFFICE.

FRANK BARNER TICE, OF POLO, ILLINOIS.

GATE.

939,568.  Specification of Letters Patent.  Patented Nov. 9, 1909.

Application filed September 17, 1908. Serial No. 453,530.

*To all whom it may concern:*

Be it known that I, FRANK BARNER TICE, a citizen of the United States, residing at Polo, in the county of Ogle and State of Illinois, have invented certain new and useful Improvements in Gates; and I do declare the following to be a full, clear, and exact description of the invention, such as will enable others skilled in the art to which it appertains to make and use the same.

This invention relates to improvements in sliding gates, and has for its object to provide resilient means for automatically holding the gate at any desired adjustment and to provide manually operable connections for releasing said holding means in order that the gate may be raised or lowered.

While my improved gate is primarily designed for hog loading frames, it may be used in any other connection desired.

With this and other objects in view, the invention consists of certain novel features of construction, combination and arrangement of parts, as will be more fully described and particularly pointed out in the appended claims.

In the accompanying drawings: Figure 1, is a front elevation of a gate embodying my improvements as arranged in its frame. Fig. 2, is a vertical transverse section taken on line 2—2 of Fig. 1., and Fig. 3, is a horizontal section taken on line 3—3, of Fig. 1.

Referring to the drawings for a more particular description of the invention, the sliding gate 1, consisting of the vertical and cross pieces 2 and 3, respectively, is slidably mounted between the uprights 4, of the frame 5. These uprights are suitably recessed in their inner edges, as at 6, to receive the ends of the gate. Pivoted to the upper edge and at opposite ends of the gate, are the clutch bars 7, the lower free ends of which are normally held out in braking position or against the walls 8, formed by the recesses in the uprights, by means of the coil springs 9. The free end of each clutch bar is connected with the adjacent end of the gate by a pair of links 10 and 11, which have their outer ends connected, respectively, with the clutch bars and the gate and their inner ends connected together. Cords 12 and 13 are connected at their lower ends with the inner ends of the links and at their upper ends with the operating cord 14, which passes over the top of the frame. As heretofore explained, the gate is normally held against vertical sliding movement by the clutch bars, which are held in braking position by the coil springs 9. However, when it is desired to raise the gate, the operator pulls upon the operating cord 14, which swings the inner or connected ends of the links up and causes the clutch bars to swing inwardly out of engagement with the walls 8, of the uprights.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters-Patent is:—

1. In combination, a sliding gate, a clutch bar pivoted thereto, a spring to normally hold the free end of the clutch bar in outward or braking position, and manually operable means to swing the free end of the clutch bar inwardly toward the gate or out of braking position.

2. In combination, a sliding gate, a pair of clutch bars pivoted to the upper edge and at opposite ends of the gate, springs between the free ends of the clutch bars and the gate to normally hold the former in outward or braking position, and pivotal means between the clutch bars and gate operable to swing the free ends of the former inwardly or out of braking position.

3. In combination, a sliding gate, a pair of clutch bars pivoted to the upper edge and at opposite ends of the gate, springs between the free ends of the clutch bars and the gate for normally holding the former in outward or braking position, links pivoted at their outer ends to the clutch bars and gate respectively and connected together at their inner ends, and cords connected to the inner ends of the links whereby said links cause the free ends of the clutch bars to
5 swing inwardly out of braking position when a pull is exerted upon the said cords.

In testimony whereof I have hereunto set my hand in presence of two subscribing witnesses.

FRANK BARNER TICE.

Witnesses:
E. H. CLOPPER,
PEARL MESSNER.